(12) United States Patent (10) Patent No.: US 8,941,340 B2
Meiners et al. (45) Date of Patent: Jan. 27, 2015

(54) REGENERATIVE VARIABLE FREQUENCY DRIVE

(71) Applicant: Phase Technologies, LLC, Rapid City, SD (US)

(72) Inventors: Larry G. Meiners, Rapid City, SD (US); Theodore Clifton Pettyjohn, Rapid City, SD (US); Jack Yongchen Yang, Rapid City, SD (US); Peda V. Medagam, Rapid City, SD (US)

( * ) Notice: Subject to any disclaimer, the term of this patent is extended or adjusted under 35 U.S.C. 154(b) by 162 days.

(21) Appl. No.: 13/678,637

(22) Filed: Nov. 16, 2012

(65) Prior Publication Data

US 2013/0127381 A1 May 23, 2013

Related U.S. Application Data

(60) Provisional application No. 61/561,313, filed on Nov. 18, 2011.

(51) Int. Cl.
*H02P 23/06* (2006.01)
*H02M 5/40* (2006.01)
*H02P 23/00* (2006.01)
*H02M 5/458* (2006.01)

(52) U.S. Cl.
CPC ......... *H02P 23/0081* (2013.01); *H02M 5/4585* (2013.01)
USPC .............. 318/400.26; 318/400.29; 318/400.3; 363/35

(58) Field of Classification Search
CPC . H02M 5/4585; H02M 5/458; H02M 7/1623; H02P 27/06; H02P 9/30; B60K 6/28; B60L 11/005
USPC ............. 318/400.26, 400.27, 400.28, 400.29, 318/400.3, 376, 440, 441, 442; 363/13, 34, 363/35, 37
See application file for complete search history.

(56) References Cited

U.S. PATENT DOCUMENTS

| | | | |
|---|---|---|---|
| 4,697,131 A | 9/1987 | Schauder et al. | |
| 5,471,125 A * | 11/1995 | Wu ................................ | 318/803 |
| 5,615,099 A * | 3/1997 | Nakazawa ...................... | 363/96 |
| 5,771,164 A * | 6/1998 | Murai et al. .................... | 363/89 |
| 5,969,957 A | 10/1999 | Divan et al. | |
| 5,991,169 A * | 11/1999 | Kooken .......................... | 363/17 |
| 6,600,278 B1 | 7/2003 | Bretzius | |
| 6,804,127 B2 * | 10/2004 | Zhou ............................... | 363/37 |
| 7,227,330 B2 | 6/2007 | Swamy et al. | |
| 7,327,587 B2 * | 2/2008 | Mhaskar et al. ................ | 363/37 |
| 7,508,147 B2 | 3/2009 | Rastogi et al. | |
| 7,599,196 B2 * | 10/2009 | Alexander ...................... | 363/13 |
| 7,619,906 B2 * | 11/2009 | Schnetzka ....................... | 363/34 |
| 7,738,267 B1 | 6/2010 | Tallam et al. | |
| 7,778,045 B2 | 8/2010 | Alexander | |
| 8,107,267 B2 | 1/2012 | Tallam et al. | |
| 8,242,739 B2 * | 8/2012 | Krauer et al. .................. | 320/107 |
| 8,259,426 B2 * | 9/2012 | Xiao et al. ...................... | 361/88 |

(Continued)

*Primary Examiner* — Bentsu Ro
(74) *Attorney, Agent, or Firm* — Ancel W. Lewis, Jr.

(57) ABSTRACT

A regenerative variable frequency drive includes an active converter connected to an inverter. The converter has a filter capacitor, an inductor, two half bridges, bus bars that connect to the inverter and bus capacitors. The converter converts single phase AC power to DC power and DC power to single phase AC power, boosts the AC power, reduces input line harmonics, maintains input current in phase with utility voltage in order to achieve near unity power factor, and maintains constant DC voltage between the bus bars.

22 Claims, 3 Drawing Sheets

(56) References Cited

U.S. PATENT DOCUMENTS 8,295,069 B2 * 10/2012 Alexander .................. 363/132

2010/0073969 A1 3/2010 Rajagopalan et al.
2013/0106328 A1 * 5/2013 Kopiness et al. ........ 318/400.11

* cited by examiner

REGENERATIVE VARIABLE FREQUENCY DRIVE

This application claims the benefit under 35 U.S.C. §119 (e) of the U.S. provisional patent application No. 61/561,313 filed Nov. 18, 2011.

TECHNICAL FIELD

The present invention relates to variable frequency drives and more particularly to a regenerative variable frequency drive with an active converter that converts single-phase AC input to three-phase variable frequency AC output.

BACKGROUND ART

A variable frequency drive controls the speed and torque of an alternating current (AC) motor by varying the input frequency and voltage. Three-phase motors provide higher mechanical efficiency, higher power factor and less torque ripple than single-phase motors and are therefore a more desirable choice. Variable frequency drives in the past have generally included a diode rectifier, that converts AC power to direct current (DC) power, connected through a DC bus to an inverter that supplies three phase, variable frequency AC power to a three-phase motor.

When a motor turns faster than the speed designated by the variable frequency drive, the motor acts as a generator, generating power that is returned to the DC bus. In a variable frequency drive with a diode rectifier, the rectification of the AC power to the DC bus is a one-way street and the generated power causes the voltage on the DC bus to rise.

One known method of handling the generated power is to add a dynamic braking resistor to the variable frequency drive. When the voltage on the DC bus rises due to the generated power, the generated power is shunted to the dynamic braking resistor that converts the generated power to heat. Dynamic braking resistors add complexity and expense to a variable frequency drive installation.

The generated power can alternatively be handled with a regenerative variable frequency drive that has an active converter instead of the one-way diode rectifier. An active converter allows power to flow from the AC source to the DC bus and from the DC bus back to the AC source. A regenerative variable frequency drive puts the generated power back onto the line, and thereby reduces the total power consumption of the load.

Regenerative variable frequency drives with three-phase active converters are known. A conventional diode rectifier drive can convert AC power from a single-phase source to charge the DC bus. The known three-phase active converters cannot convert the power from a single-phase AC source to charge the DC bus.

Three-phase AC power is generally supplied to industrial areas. However, only single phase AC power is available to most residential and rural areas. The single phase AC power available in most residential and rural areas is provided by a step down transformer connected to a high voltage line and, in the United States, is normally supplied as about 240 volts at 60 Hz between the first and second input lines. Many three-phase induction motors are operated at high voltage such as about 460 volts to reduce the current passing between the inverter of the variable frequency drive and the motor, and thereby reducing the required size of the connecting cables. Diode rectifier converters cannot directly boost the incoming 240 volts to 460 volts.

Diode rectifiers distort the current drawn from the power grid. This distortion creates harmonic distortions that may affect other users on the grid. The distortion also reduces the power factor. A variable frequency drive with a diode rectifier therefore requires additional circuitry for power factor correction and harmonic filtering.

DISCLOSURE OF THE INVENTION

A regenerative variable frequency drive for converting single phase AC power to variable frequency three phase AC power includes an active converter that converts single phase AC power to DC power and DC power to single phase AC power and an inverter that converts DC power to variable frequency, three phase AC power, and variable frequency, three phase AC power to DC power. The converter includes first and second input lines that connect to a single phase AC power source, first and second inductors, a filter capacitor, active half bridge first and second modules, a positive bus bar, a negative bus bar, first and second bus capacitors and a controller. The inductors each have two coils and are connected in series with the filter capacitor connecting between the coils, between the inductors. The input lines connect to the coils, with one coil connecting to the first module and the other coil connecting to the second module, opposite the terminals. The modules each have a pair of switches and a pair of diodes, and each connect to the positive and negative bus bars. The bus capacitors connect together in series and connect between the positive and negative bus bars. The bus bars connect to the inverter. The controller monitors voltages and input current, and drives the switches with a pulse width modulated signal having a modulation index. The controller adjusts the modulation index to maintain a selected voltage between the bus bars, to provide correctly phased sinusoidal current from and to the power grid and to boost the single phase AC input voltage.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
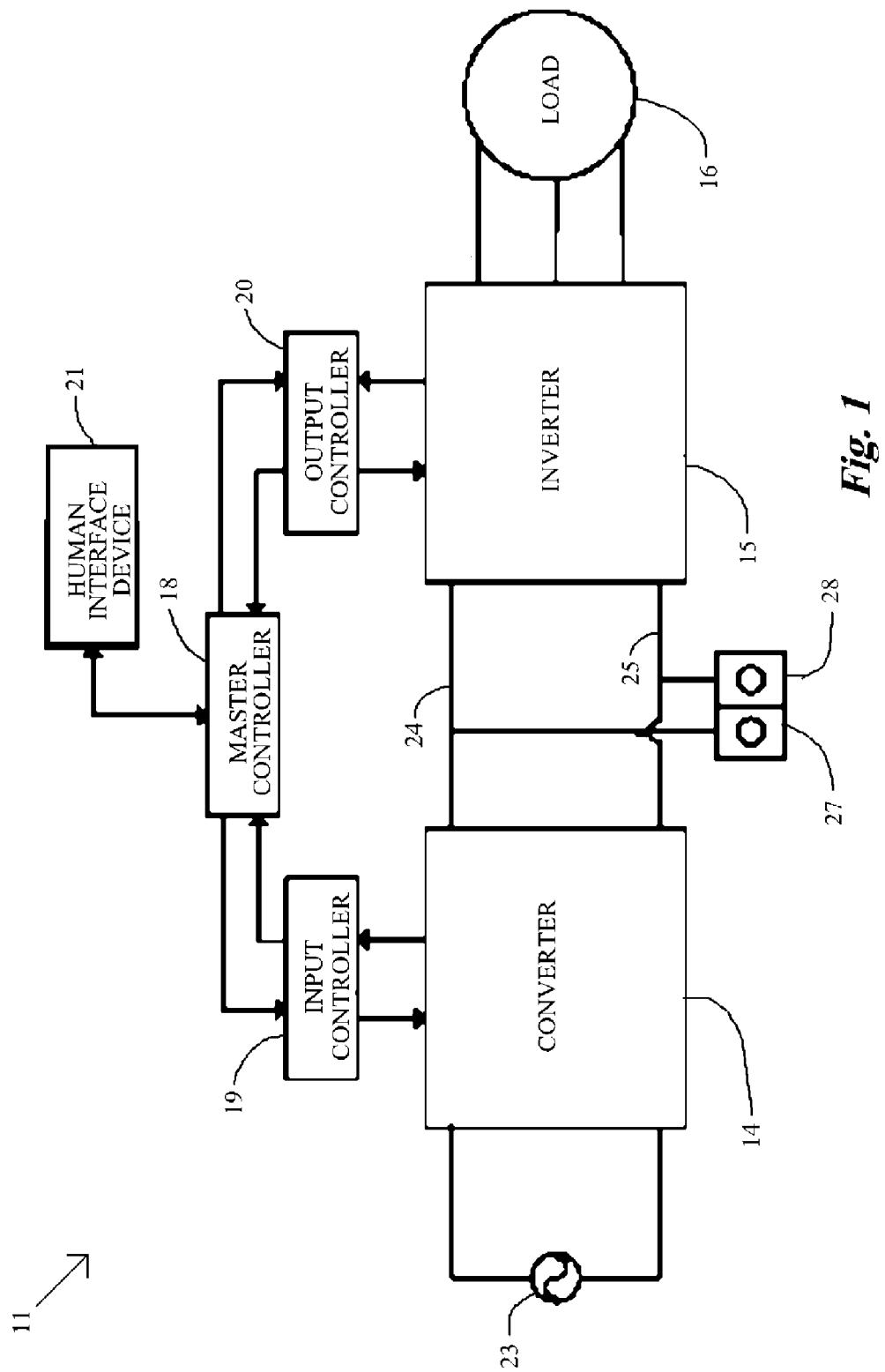
FIG. 1 is a block diagram of a variable frequency drive embodying the features of the present invention.

Referring to FIG. 1, a regenerative variable frequency drive 11, embodying the features of the present invention, includes an active converter 14 connected to an inverter 15. The inverter 15 connects to and drives a load 16, such as a motor. A master controller 18 controls the drive 11. The master controller connects to an input controller 19, an output controller 20 and a human interface device 21.

The input controller 19 connects to and controls the converter 14. The converter 14 connects to a single phase AC power source 23. Generally, the source 23 will be a utility power grid. In the United States, the source 23 will typically provide power at 240V at 60 Hz.

The converter 14 converts single phase AC power to DC power and DC power to single phase AC power. The converter 14 connects to and provides DC power to the inverter 15 through a positive bus bar 24 and a negative bus bar 25. The drive 11 includes a positive terminal 27 that connects to the positive bus bar 24 and a negative terminal 28 that connects to the negative bus bar 25, so that the drive 11 can provide DC power to a DC load.

The output controller 20 connects to and controls the inverter 15. The inverter 15 draws DC power from the positive and negative bus bars 24 and 25, and provides variable frequency, three phase AC power to the load 16. When the load 16 supplies power back to the inverter 15, as with a motor overrunning, the inverter 15 converts the AC power generated by the load 16 to DC power, and supplies that DC power to the positive and negative bus bars 24 and 25. The human interface device 21 allows a user to set the speed and direction of the load 16.

Figure 2:
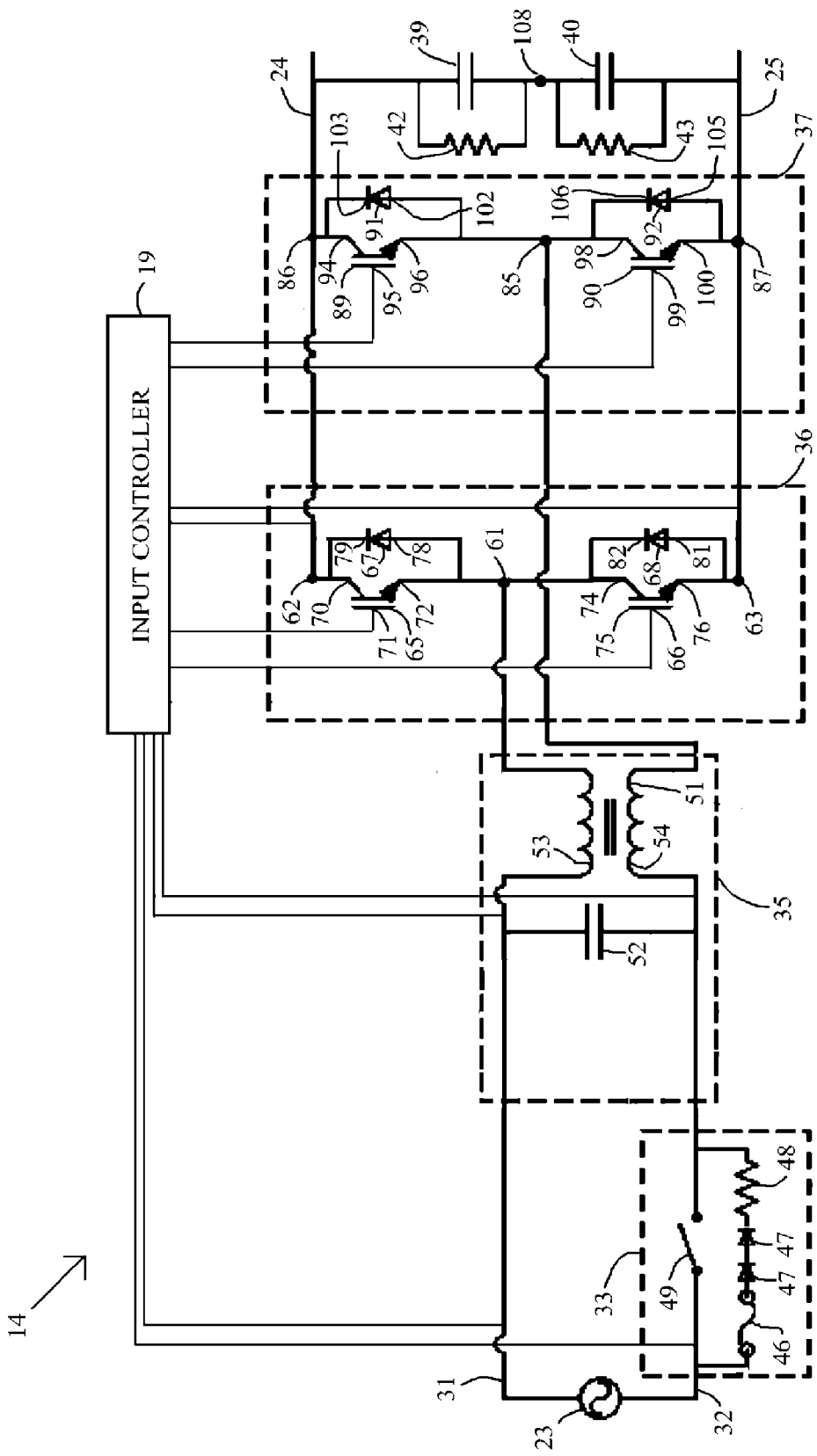
FIG. 2 is a schematic diagram of the active converter of FIG. 1 with an LC filter.
Figure 3:
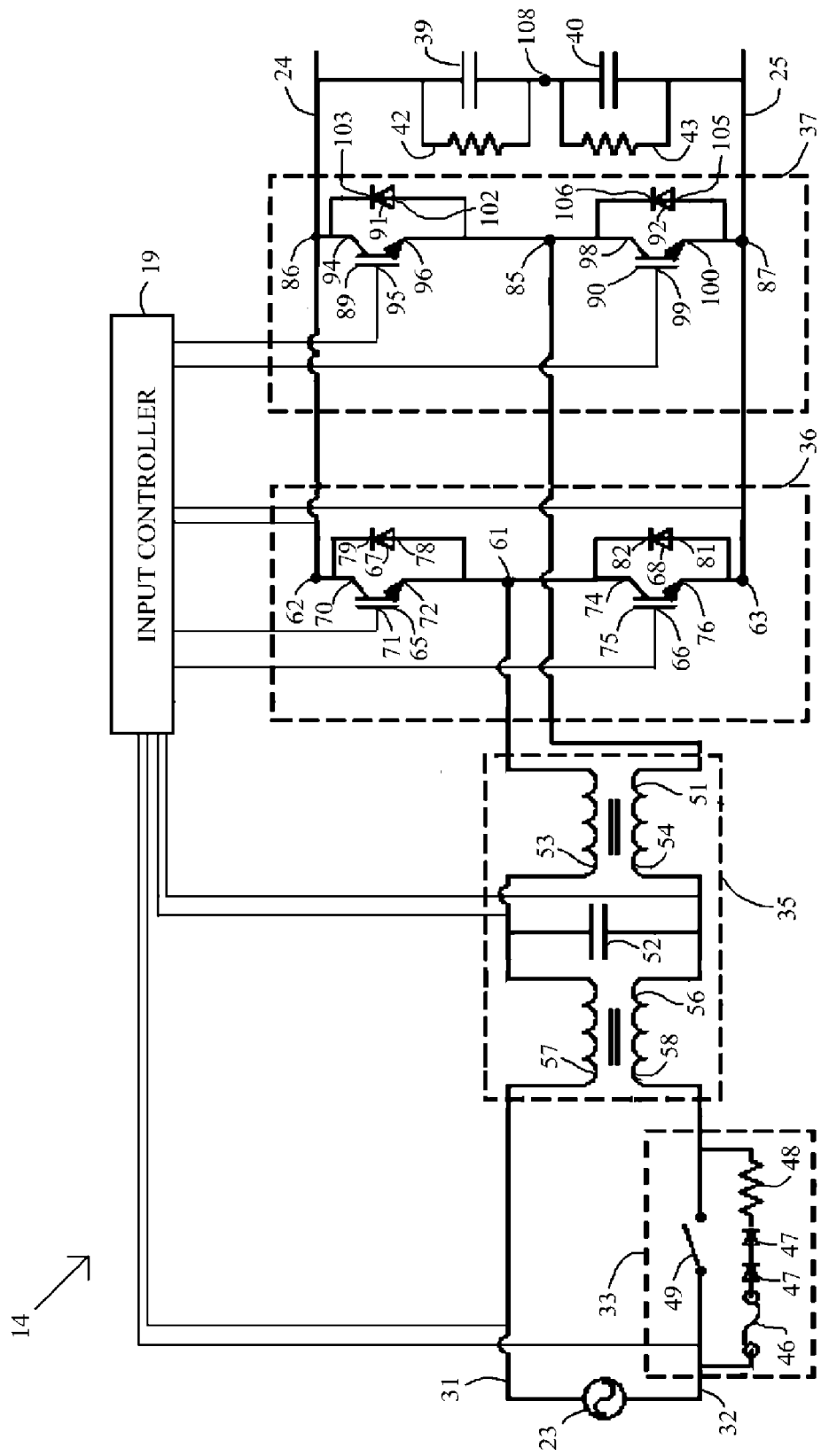
FIG. 3 is a schematic diagram of the active converter of FIG. 1 with an LCL filter.

As shown in FIGS. 2 and 3, the converter 14 includes first and second input lines 31 and 32, a precharging circuit 33, a filter 35, first and second modules 36 and 37, first and second bus capacitors 39 and 40, first and second resistors 42 and 43, the positive and negative bus bars 24 and 25, and the input controller 19. The first and second input lines 31 and 32 connect to the source 23. The precharging circuit 33 connects along the second input line 32 and includes a fuse 46, two diodes 47 and a resistor 48 in connected in series circuit, and a switch 49 connected in parallel to the series circuit.

The filter 35 in FIG. 2 is an LC filter with a first inductor 51 and a filter capacitor 52. The first inductor 51 has a first coil 53 that connects to the first input line 31 opposite the source 23 and a second coil 54 that connects to the precharging circuit 33 opposite the source 23. The filter capacitor 52 connects from the first coil 53 to the second coil 54, between the first inductor 51 and the source 23. The filter 35 in FIG. 3 is an LCL filter that additionally includes a second inductor 56 between the source 23 and the filter capacitor 52. The second inductor 56 has a first coil 57 that connects to the first input line 31 at one end and to the first coil 53 of the first inductor 51 at the other end, and a second coil 58 that connects from the precharging circuit 33 to the second coil 54 of the first inductor 51.

The first and second modules 36 and 37 are each active half bridges. The first module 36 has an input 61, a positive output 62, a negative output 63, first and second switches 65 and 66, and first and second diodes 67 and 68. The input 61 connects to the first coil 53 of the first inductor 51 opposite the source 23. The first and second switches 65 and 66 are preferably solid state switches and more preferably Insulated Gate Bipolar Transistors (IGBT). Other switches such as bipolar junction transistors or devices developed in the future might also be used.

The first switch 65 has a collector 70, a base 71 and an emitter 72. The second switch 66 has a collector 74, a base 75 and an emitter 76. The first diode 67 has an anode 78 and a cathode 79, and the second diode 68 has an anode 81 and a cathode 82. The input 61 connects to the emitter 72 of the first switch 65, the collector 74 of the second switch 66, the anode 78 of the first diode 67 and the cathode 82 of the second diode 68. The collector 70 of the first switch 65 and the cathode 79 of the first diode 67 connect to the positive output 62. The emitter 76 of the second switch 66 and the anode 81 of the second diode 68 connect to the negative output 63. The positive output 62 connects to the positive bus bar 24 and the negative output 63 connects to the negative bus bar 25.

The second module 37 has an input 85, a positive output 86, a negative output 87, first and second switches 89 and 90, and first and second diodes 91 and 92. The input 85 connects to the second coil 54 of the first inductor 51 opposite the source 23. The first and second switches 91 and 92 are preferably solid state switches and more preferably Insulated Gate Bipolar Transistors (IGBT). Other switches such as bipolar junction transistors or devices developed in the future might also be used.

The first switch 89 has a collector 94, a base 95 and an emitter 96. The second switch 90 has a collector 98, a base 99 and an emitter 100. The first diode 91 has an anode 102 and a cathode 103, and the second diode 92 has an anode 105 and a cathode 106. The input 85 connects to the emitter 96 of the first switch 89, the collector 98 of the second switch 90, the anode 102 of the first diode 91 and the cathode 106 of the second diode 92. The collector 94 of the first switch 89 and the cathode 103 of the first diode 91 connect to the positive output 86. The emitter 100 of the second switch 90 and the anode 105 of the second diode 92 connect to the negative output 87. The positive output 86 connects to the positive bus bar 24 and the negative output 87 connects to the negative bus bar 25.

The first and second bus capacitors 39 and 40 are connected together in series at connection node 108. The first bus capacitor 39 connects to the positive bus bar 24 opposite connection node 108, and the second bus capacitor 40 connects to the negative bus bar 25 opposite the connection node 108. One end of first resistor 42 connects to the positive bus bar 24 and the other end of first resistor 42 connects to the connection node 108. One end of second resistor 43 connects to the negative bus bar 25 and the other end of second resistor 43 connects to the connection node 108. The first and second resistors 42 and 43 are balancing resistors that insure that the voltage between the positive bus bar 24 and the connection node 108 equals the voltage between the connection node 108 and the negative bus bar 25.

The input controller 19 connects to the bases 71, 75, 95 and 99 of the first switches 65 and 89 and the second switches 66 and 90 of the first and second modules 36 and 37, and drives the first switches 65 and 89 and the second switches 66 and 90 of the first and second modules 36 and 37. The input controller 19 connects to the first and second input lines 31 and 32, to opposite ends of the filter capacitor 52, and to the positive and negative bus bars 24 and 25 to monitor input current and voltage, voltage across the filter capacitor 52, and the voltage between the positive and negative bus bars 24 and 25.

To avoid excessively high input current when power is applied to the converter 14, switch 49 is initially open and pre-charging current is supplied through the diodes 47 and the current-limiting resistor 48 in the precharging circuit 33. After the first and second bus capacitors 39 and 40 are charged, the switch 49 is closed to bypass resistor 48.

The input voltage is $V_{12}=V_1-V_2$, the voltage across the filter capacitor 52 is $v_{ab}=V_a-V_b$, the voltage at the connection node 108 is $V_z$, and the voltage between the positive and negative bus bars 24 and 25 is $2V_{dc}=(V_{POS}-V_z)+(V_z-V_{NEG})$. The first module 36 is driven to produce a pulse width modulated signal at input 61 that has an average value given by:

$$v_{az}=V_{dc}M\cos(\omega_o t),$$

The second module 37 is driven to produce a pulse width modulated signal at input 85 that has an average value given by:

$$v_{bz}=-V_{dc}M\cos(\omega_o t).$$

where M is the modulation index ($0<=M<=1$), $\omega_o$ is the frequency of the input voltage, and $\cos(\omega_o t)$ is the cosine of the input voltage frequency ($1=>\cos(\omega_o t)=>-1$). The difference in voltage between the input 61 of the first module 36 and the input 85 of the second module 37 is given by:

$$v_{ab}=v_{az}-v_{bz}=2V_{dc}M\cos(\omega_o t).$$

As long as the value $2V_{dc}$ is greater than the peak value of the input voltage $V_{12}$, at any instant in time the value of M can be adjusted to make $v_{ab}$ at that instant either less than, equal to, or greater than the input voltage $V_{12}$. The input voltage $V_{12}$ is separated from the voltage $v_{ab}$ by the first inductor 51 in FIG. 2, and the first and second inductors 51 and 56 in FIG. 3, so that: (1) if $V_{12}$ and $v_{ab}$ are equal there will be no change in the current through the inductors, (2) if $V_{12}$ is greater than $v_{ab}$ the current through the inductors will increase, or (3) if $V_{12}$ is less than $v_{ab}$ the current through the inductors will decrease. The input controller 19 can make instantaneous adjustments to the value of M to induce any desired value of input current. The input current can be controlled so that the average value of the voltage $2V_{dc}$ remains constant even though electrical charge is being removed from the first and second bus capacitors 39 and 40 by the inverter 15. The value of M can also be adjusted so that the input current is sinusoidal. If the converter 14 is delivering power to the inverter 15 and subsequently to the load 16, then the input current will need to be in phase with the input voltage. If the load 16 is delivering power to the converter then the input current will need to be 180 degrees out of phase with the input voltage.

The converter 14 can also boost the voltage of the incoming power. As an example, and not as a limitation, the converter can boost single phase 240 volt AC power to 460 volts. When $V_{12}>0$, the second switch 66 of the first module 36 is turned on, and current flows from the source 23 through the first coil 53 of the first inductor 51, through the input 61 and second switch 66 of the first module 36, through the negative bus bar 25, through the second diode 92 and input 85 of the second module 37, through the second coil 54 of the first inductor 51 and back to the source 23. The current will be a steadily increasing ramp which will stop increasing only when the second switch 66 of the first module 36 is turned off. Thus the maximum current is determined by the width of the controller pulse to the second switch 66 of the first module 36. The ramp rate is determined by the inductance values, the value of $V_{12}$, and the equation $V_{12} = L\, dI/dt$.

When the second switch 66 of the first module 36 turns off, the first inductor 51 will develop a voltage which keeps the current constant during the transition. Current now flows from the source 23 through the first coil 53 of the first inductor 51, through the input 61 and first diode 67 of the first module 36, through the positive bus bar 24, through the first and second bus capacitors 39 and 40, through the second diode 92 and input 85 of the second module 37, through the second coil 54 of the first inductor 51 and back to the source 23. This current charges the first and second bus capacitors 39 and 40. During the charging cycle the current decays at a rate determined by the inductance value of the first inductor 51, the voltage $(V_{12} - V_{POS} + V_{NEG})$ and the equation $(V_{12} - V_{POS} + V_{NEG}) = L\, dI/dt$. The amount of charging current can have any desired value, determined only by the width of the pulses, and the first and second bus capacitors 39 and 40 can be charged to any desired value. The charging sequence could also have been implemented by switching the first switch 89 of the second module 37. When the voltage $V_{12} < 0$, charging can be implemented by switching either the first switch 65 of the first module 36 or the second switch 90 of the second module 37.

Although the present invention has been described with a certain degree of particularity, it is understood that the present disclosure has been made by way of example and that changes in details of structure may be made without departing from the spirit thereof.

What is claimed is:

1. A regenerative variable frequency drive for converting single phase AC power from a power grid to three phase, variable frequency AC power and said three phase, variable frequency AC power to single phase AC power, comprising:

a single phase AC power source, an inverter that converts DC power to variable frequency, three phase AC power, and variable frequency, three phase AC power to DC power, and an active converter for converting single phase AC power to DC power and DC power to single phase AC power, including:

first and second input lines connected to said source, a first inductor having a first coil connected to said first input line and a second coil connected to said second input line, an active half bridge first module having an input, a positive output, and a negative output, said input connecting to said first coil of said first inductor opposite said first input line, an active half bridge second module having an input, a positive output, and a negative output, said input connecting to said second coil of said first inductor opposite said second input line, a positive bus bar connected to said positive outputs of said first and second modules, and to said inverter, a negative bus bar connected to said negative outputs of said first and second modules, and to said inverter, a first bus capacitor connected between said positive and negative bus bars, and a controller connected to said first and second modules and driving said first and second modules with a pulse width modulated signal having a modulation index, said controller adjusting said index and controlling current at said first inductor to maintain a selected voltage between said positive and negative bus bars and to provide correctly phased sinusoidal current from and to said source.

2. The variable frequency drive as set forth in claim 1 wherein said controller adjusts said index to boost the voltage of said source.

3. The variable frequency drive as set forth in claim 1 wherein:

said first module includes first and second switches each having a collector, a base and an emitter, and first and second diodes each having an anode and a cathode, said emitter of said first switch, said collector of said second switch, said anode of said first diode and said cathode of said second diode connecting to said input, said collector of said first switch and said cathode of said first diode connecting to said positive output, and said emitter of said second switch and said anode of said second diode connecting to said negative output, said second module includes first and second switches each having a collector, a base and an emitter, and first and second diodes each having an anode and a cathode, said emitter of said first switch, said collector of said second switch, said anode of said first diode and said cathode of said second diode connecting to said input, said collector of said first switch and said cathode of said first diode connecting to said positive output, and said emitter of said second switch and said anode of said second diode connecting to said negative output, and said controller connects to and drives said bases of said first and second switches of said first and second modules.

4. The variable frequency drive as set forth in claim 3 wherein said first and second switches in said first and second modules are isolated gate bipolar transistors.

5. The variable frequency drive as set forth in claim 1 wherein said first bus capacitor connects to said positive bus bar and said converter includes a second bus capacitor connected to said first bus capacitor opposite said positive bus bar and to said negative bus bar opposite said first bus capacitor, said first and second bus capacitors having equal capacitance.

6. The variable frequency drive as set forth in claim 5 wherein said converter includes a first resistor connected from said positive bus bar to said second bus capacitor and a second resistor connected from said negative bus bar to said first bus capacitor, said first and second resistors having equal resistance to balance said first and second bus capacitors.

7. The variable frequency drive as set forth in claim 5 wherein said converter includes a precharging circuit connected along one of said first and second input lines, said circuit including a resistor that limits initial current and a switch that bypasses said resistor after said first and second bus capacitors are charged.

8. The variable frequency drive as set forth in claim 1 wherein said converter includes a filter capacitor connected from said first input line to said second input line.

9. The variable frequency drive as set forth in claim 8 wherein said converter includes a second inductor having a first coil connected along said first input line and a second coil connected along said second input line, with said filter capacitor being between said first and second inductors.

10. The variable frequency drive as set forth in claim 8 wherein said controller connects to and monitors current in said first input line.

11. The variable frequency drive as set forth in claim 8 wherein said controller connects to and monitors voltage on said first and second input lines, voltage across said filter capacitor, and voltages on said positive and negative bus bars.

12. An active converter for converting single phase AC power to DC power and DC power to single phase AC power, comprising:
a single phase AC power source,
first and second input lines connected to said source,
a first inductor having a first coil connected to said first input line and a second coil connected to said second input line,
an active half bridge first module having an input, a positive output, and a negative output, said input connecting to said first coil of said first inductor opposite said first input line,
an active half bridge second module having an input, a positive output, and a negative output, said input connecting to said second coil of said first inductor opposite said second input line,
a positive bus bar connected to said positive outputs of said first and second modules,
a negative bus bar connected to said negative outputs of said first and second modules,
a first bus capacitor connected between said positive and negative bus bars, and
a controller connected to said first and second modules and driving said first and second modules with a pulse width modulated signal having a modulation index, said controller adjusting said index and controlling current at said first inductor to maintain a selected voltage between said positive and negative bus bars and to provide correctly phased sinusoidal current from and to said source.

13. The converter as set forth in claim 12 wherein said controller adjusts said index to boost the voltage of said source.

14. The converter as set forth in claim 12 wherein:
said first module includes first and second switches each having a collector, a base and an emitter, and first and second diodes each having an anode and a cathode, said emitter of said first switch, said collector of said second switch, said anode of said first diode and said cathode of said second diode connecting to said input, said collector of said first switch and said cathode of said first diode connecting to said positive output, and said emitter of said second switch and said anode of said second diode connecting to said negative output,
said second module includes first and second switches each having a collector, a base and an emitter, and first and second diodes each having an anode and a cathode, said emitter of said first switch, said collector of said second switch, said anode of said first diode and said cathode of said second diode connecting to said input, said collector of said first switch and said cathode of said first diode connecting to said positive output, and said emitter of said second switch and said anode of said second diode connecting to said negative output, and
said controller connects to and drives said bases of said first and second switches of said first and second modules.

15. The converter as set forth in claim 14 wherein said first and second switches in said first and second modules are isolated gate bipolar transistors.

16. The converter as set forth in claim 12:
wherein said first bus capacitor connects to said positive bus bar, and
including a second bus capacitor connected to said first bus capacitor opposite said positive bus bar and to said negative bus bar opposite said first bus capacitor, said first and second bus capacitors having equal capacitance.

17. The converter as set forth in claim 16 including a first resistor connected from said positive bus bar to said second bus capacitor and a second resistor connected from said negative bus bar to said first bus capacitor, said first and second resistors having equal resistance to balance said first and second bus capacitors.

18. The converter as set forth in claim 16 including a precharging circuit connected along one of said first and second input lines, said circuit including a resistor that limits initial current and a switch that bypasses said resistor after said first and second bus capacitors are charged.

19. The converter as set forth in claim 12 including a filter capacitor connected from said first input line to said second input line.

20. The converter as set forth in claim 19 including a second inductor having a first coil connected along said first input line and a second coil connected along said second input line, with said filter capacitor being between said first and second inductors.

21. The converter as set forth in claim 19 wherein said controller connects to and monitors current in said first input line.

22. The converter as set forth in claim 19 wherein said controller connects to and monitors voltage on said first and second input lines, voltage across said filter capacitor, and voltages on said positive and negative bus bars.

* * * * *